United States Patent [19]

Clinnin et al.

[11] Patent Number: 5,211,989
[45] Date of Patent: May 18, 1993

[54] CLEAR HYDROPHILIC COATING FOR HEAT EXCHANGER FINS

[75] Inventors: David D. Clinnin, Schaumburg; Ronald J. Lewarchik, Sleepy Hollow, both of Ill.; Dexter F. Sunderman, Hartselle, Ala.

[73] Assignee: Morton Coatings, Inc., Chicago, Ill.

[21] Appl. No.: 867,585

[22] Filed: Apr. 13, 1992

[51] Int. Cl.$^5$ ............................................. B05D 3/02
[52] U.S. Cl. .............................. 427/388.4; 427/388.2; 428/463; 524/389; 524/251; 524/322
[58] Field of Search ............... 524/389, 251, 322; 427/388.2, 388.4; 428/463

[56] References Cited

U.S. PATENT DOCUMENTS

| | | | |
|---|---|---|---|
| 3,468,753 | 9/1969 | Vincent et al. | 161/216 |
| 3,968,311 | 7/1976 | Hekal et al. | 428/500 |
| 4,001,159 | 1/1977 | Imai et al. | 428/500 |
| 4,060,657 | 11/1977 | Iwami et al. | 524/558 |
| 4,148,948 | 4/1979 | Williams | 427/388.4 |
| 4,181,733 | 1/1980 | Rickert, Jr. | 428/329 |
| 4,421,789 | 12/1983 | Kaneko et al. | 428/450 |
| 4,503,907 | 3/1985 | Tanaka et al. | 165/133 |
| 4,588,025 | 5/1986 | Imai et al. | 165/133 |
| 4,783,224 | 11/1988 | Sako et al. | 427/388.4 |
| 5,012,862 | 5/1991 | Espeut et al. | 165/133 |

FOREIGN PATENT DOCUMENTS 6280494 10/1985 Japan .

Primary Examiner—Paul R. Michl
Assistant Examiner—Olga Asinovsky
Attorney, Agent, or Firm—Robert M. Didrick; Gerald K. White

[57] ABSTRACT

The combination of an ethylene/acrylic acid copolymer and a water soluble amine salt of a fatty acid is useful as a hydrophilic coating for the surfaces of fins in a heat exchanger. The exchanger is more efficient because the coating prevents the blockage of air flow by beads of condensed water which would otherwise build up in the narrow spaces between the fins.

9 Claims, No Drawings

CLEAR HYDROPHILIC COATING FOR HEAT EXCHANGER FINS

This invention relates to a process for the treatment of the surfaces of aluminum fins for heat exchangers and, more particularly, to a coating for those surfaces which is hydrophilic and which provides corrosion resistance to the aluminum.

BACKGROUND OF THE INVENTION

A heat exchanger comprises a plurality of parallel, spaced apart fins defining air flow passages. The fins are made of aluminum because of its excellent heat conductance and are designed to have the surface areas of the fins as large as possible in order to increase the heat radiation or cooling effect. The spaces between the fins are very narrow in order to pack more cooling area into as small a unit as possible. As a result, particularly when the exchanger is used for cooling, moisture from warm air passing through the unit condenses on the cold fin surfaces and, if those surfaces are hydrophobic, beads of water accumulate to block the narrow passages. The increased resistance to air flow reduces the efficiency of the heat exchanger. In order to prevent the accumulation of water between the fins, the surfaces of the fins are made hydrophilic so that a thin film of water coating the surface can slide off quickly, a phenomenon known in the industry as sheeting off.

Some of the methods known to make the surfaces more hydrophilic include coating the surface with an acrylic acid resin by itself or with a mixture of the resin with water glass (i.e., sodium silicate). In others, such as that taught in U. S. Pat. No. 4,181,773, the surface of an aluminum article is made water wettable by coating it with a continuous film of a water soluble basic polymer having colloidal alumina dispersed therein, curing the polymer to water insolubility, and then hydrolyzing the surface, only, of the cured polymer film. The basic polymer is exemplified by an organic acid salt of an epoxide resin containing free amine groups. In U.S. Pat. No. 4,503,907, a mixture of a water soluble acrylic resin and a water soluble amino resin is mixed with a synthetic silica and a surface active agent such as a polyoxyethylene glycol and the mixture is coated on the fin and baked. In U. S. Pat. No. 4,588,025, the fins are treated with a coating containing an alkali silicate and carbonyl-containing low molecular weight organic compound, such as an aldehyde, ester, or amide. Upon heating, the alkali silicate reacts with the carbonyl compound, which is converted into an organic carboxylate which is then incorporated into a three dimensional reticular polymer of the silicate. In U. S. Pat. No. 5,012,862, a coating of a polysulfonic acid is applied to a fin of an aluminum heat exchanger to render the surface hydrophilic.

The problem of providing a coating which will prevent the formation of white corrosion deposits, called white rust, on the aluminum fins is addressed in U. S. Pat. No. 4,421,789. This patent teaches that a water wettable corrosion resistant coating may be provided by depositing an ethylene/acrylic acid copolymer on an aluminum panel and then applying a silica coating on the first coating. The hydrophobic character of a styrene/acrylic acid copolymer may be modified, according to the published Japanese Patent Application No. 62-80494[1987], by esterifying the acidic resin with a polyhydroxy alcohol.

There remains, however, for a simple water based system for applying a hydrophilic, corrosion resistant coating to a heat exchanger fin. It is an object of this invention, therefore, to provide a two-step—apply and dry—method for imparting corrosion resistance and water wettability to such fins.

It is another object of this invention to provide a metal-free coating composition for imparting corrosion resistance and water wettability to such fins.

SUMMARY OF THE INVENTION

These and other objects which will become apparent from the following description of the invention are achieved by applying a composition consisting essentially of an acrylic acid copolymer, an amine salt of a fatty acid, water, a water miscible alkanol, and optionally, a cross-linking agent to the surfaces of the aluminum fin stock, and baking the coated metal for a brief period. The metal need not be anodized or otherwise pretreated for corrosion resistance.

DETAILED DESCRIPTION OF THE INVENTION

The acrylic acid copolymer preferably is made from an 80/20 by weight mixture of olefinic and acrylic acid monomers because of the optimum adhesion of the resin at that ratio although resins having more or less of the acidic monomer are contemplated for the purposes of this invention. Thus, the ratio may be from about 85:15 to about 75:25 by weight. Also, although the coating composition is described herein in terms ethylene as the olefinic monomer, an olefinic monomer such as propylene is contemplated as a full or partial replacement for the ethylene and others such as styrene and an alpha-olefin such as butene-1 are contemplated as partial replacements. In like manner, the acrylic acid may be replaced wholly or partially by methacrylic acid; the term acrylic is used herein to include methacrylic. The melt index of the copolymer is from about 300 to about 3000 g/10 min, as correlated from the melt flow rates obtained with conditions (A) 125/0.325 and (B) 125/2.16 of ASTM Test Method D-12 38. Preferably, the Weight average molecular weight of the copolymer is about 18,000 and the number average molecular weight is about 7000. A currently preferred copolymer is one sold by The Dow Chemical Company under the trademark and number PRIMACOR 5980.

The amine salt of a fatty acid is preferably completely soluble in water although salts having borderline solubility in water may be used since a water miscible alkanol such as methanol, ethanol, n-propanol and isopropanol or a mixture thereof is used to make up the coating composition. An amine salt sold as a water soluble synthetic lubricant by Coral International under the trademark and number COR DRAW 6309 is currently preferred. The acid of this amine salt is a mixture, predominantly C16 and C18 fatty acids, the C18 being exemplified by stearic and oleic acids.

Optionally, the solvent resistance of the coating may be increased by the addition of a cross-linking agent to the aqueous composition. Aminoplast resins, particularly the methoxylated methylolmelamines, are preferred. Hexamethoxymethylmelamines such as those sold by American Cyanamid under the CYMEL trademark are especially preferred. Other cross-linking agents such as hexamethylenediamine and those sold by Virginia Chemical Co. under the trademarks and numbers XAMA-7 and PEI XA-1007 are examples of other cross-linking agents that are contemplated for use in this embodiment of the invention.

The coating composition is prepared by first dissolving the copolymer in an aqueous ammonia solution to a solids level of from about 30 to about 35% or more by weight. The solids level is preferably not more than 35% because of the problems associated with the high viscosity of such solutions. To control foaming, a small amount (e.g., about 0.5% of the coating mix) of ethanol may be used along with conventional anti-foam agents. Propanol or another water miscible alkanol is then added to the aqueous solution of the ammonium salt of the resin in the mixing vessel in an amount preferably about twice the weight of that solution. An additional amount of water may then be added with high speed stirring to adjust the viscosity of the original aqueous solution. The amine salt of a fatty acid is added in an amount, on a solids basis, preferably equal to about one-half of the weight of solids in the original ammoniacal aqueous solution of the copolymer as high speed stirring is continued. The cross-linking agent, if used, is preferably about 20-25%, on a solids basis, of the weight of solids in the original aqueous solution of the copolymer and is always added last. Suitably, the coating composition may contain on a solids basis from about 8 to about 12% by weight of the copolymer, from about 4 to about 6% of the amine salt, and from 0 to about 3% of the cross-linking agent. The alkanol content of the composition may be from about 50 to about 70% and the water may be from about 15 to about 25% of the total weight. The viscosity of the composition is from about 2000 to about 3500 cps.

The coating composition may be sprayed, brushed, or rolled onto the aluminum fin stock or it may be dipped into the composition. A two-roll transfer mill is preferred in order to control the thickness of the coating, which is preferably from about 0.05 to about 0.4 mil. The coated metal is then heated at from about 450° F. to about 500° F. until the metal temperature reaches a peak of about 430° to about 450° F. (about 220° to about 230° C.). The peak metal temperature is maintained for about 6 seconds.

A typical finstock is an aluminum alloy containing as alloying elements small amounts of silicon, iron, copper, manganese, and zinc. Common finstock alloys are those having the AA (Aluminum Association) designations 1100 and 7072. The finstock typically has a thickness of from about 2.5 to about 30 mils.

In order that those skilled in the art may better understand the present invention and the manner in which it may be practiced, the following specific examples are given. All parts are by weight unless otherwise stated.

EXAMPLE I

An aqueous solution (29.07 parts) of the ammonium salt of a copolymer of ethylene and acrylic acid (80:20) having a solids content of 34%, a viscosity of 3500 cps, and a Ph of 8.5 was charged into a mixing vessel, followed by 58.14 parts of isopropanol, 2.91 parts of water, and 9.88 parts of COR DRAW 6309 (47% solids), all the while mixing with a high speed Cowles mixer. A sheet of aluminum finstock was passed through a two-roll coater which picked up the coating composition from a reservoir and rolled a film onto the metal. The finstock was baked at 500° F. (260° C.) until the peak metal temperature reached about 430°-450° F. (220°-230° C.). The contact angle of a water drop on the surface of the thus coated finstock was between 20° and 25°. A strip of the coated finstock passed 672 cycles of a hydrophilicity test. One cycle of the test consisted of: dipping the strip in deionized water for 15 minutes, taking it out and allowing it to dry in air for 45 minutes. The superior hydrophilic properties of the coating was thus shown. A heat exchanger was built with fins made from the thus coated finstock and operated in the cooling mode. Condensed water on the fins was blown off in sheets (sheeted off) by air traveling through the heat exchanger.

EXAMPLE II

The general procedure of Example I was repeated except that 28.25 parts of the copolymer salt solution, 56.50 parts of the isopropanol, 2.82 parts of water, 9.61 parts of the COR-DRAW 6309 were used along with 2.82 parts of hexamethoxymethylmelamine sold by American Cyanamid under the trademark and number CYMEL 325(approx. 80% solids).

The subject matter claimed is:

1. A method for the treatment of an aluminum surface to provide thereon a corrosion resistant, hydrophilic coating which comprises coating said surface with a composition consisting essentially of water, a water miscible alkanol, an ethylene/acrylic acid copolymer, and an amine salt of a fatty acid; and drying the coating at an elevated temperature.

2. The method of claim 1 wherein the composition contains, on a solids basis, from about 8 to about 12% by weight of the ethylene/acrylic acid copolymer, from about 4 to about 6% of the amine salt of a fatty acid, and from 0 to about 3% of a cross-linking agent.

3. The method of claim 1 wherein the weight ratio of ethylene to acrylic acid is from about 75:25 to about 85:15.

4. The method of claim 2 wherein the amount of cross-linking agent is about 2% by weight.

5. The method of claim 1 wherein the amount of the copolymer is about 10% by weight.

6. The method of claim 2 wherein the amine salt is a mixture comprising $C_{16}$ and $C_{18}$ fatty acids.

7. The method of claim 6 wherein the amount of the copolymer is 10%, and the amount of amine salt is about 4.6%.

8. The method of claim 7 wherein the ratio of ethylene to acrylic acid is 80:20.

9. The method of claim 8 wherein the amount of cross-linking agent is about 2%.

* * * * *